US011128384B2

(12) United States Patent
Wang et al.

(10) Patent No.: US 11,128,384 B2
(45) Date of Patent: Sep. 21, 2021

(54) FIBER AMPLIFIER AND GAIN ADJUSTMENT METHOD FOR FIBER AMPLIFIER

(71) Applicant: HUAWEI TECHNOLOGIES CO., LTD., Guangdong (CN)

(72) Inventors: Yuanwu Wang, Wuhan (CN); Zhiwen Chang, Dongguan (CN); Guodong You, Wuhan (CN); Zhenqing Zhao, Dongguan (CN); Fei Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/014,407

(22) Filed: Sep. 8, 2020

(65) Prior Publication Data

US 2020/0403711 A1  Dec. 24, 2020

Related U.S. Application Data

(63) Continuation of application No. PCT/CN2018/078639, filed on Mar. 9, 2018.

(51) Int. Cl.
*H04B 10/67* (2013.01)
*H01S 3/067* (2006.01)
(Continued)

(52) U.S. Cl.
CPC ....... *H04B 10/673* (2013.01); *H01S 3/06754* (2013.01); *H01S 3/10069* (2013.01);
(Continued)

(58) Field of Classification Search
None
See application file for complete search history.

(56) References Cited

U.S. PATENT DOCUMENTS 6,215,584 B1    4/2001  Yang et al.
6,731,424 B1 *  5/2004  Wu ........................... H01S 5/50
                                                        359/337.1
(Continued)

FOREIGN PATENT DOCUMENTS

CN    1276924 A    12/2000
CN    1304596 A     7/2001
(Continued)

OTHER PUBLICATIONS

Bae et al., "Dynamic EDFA gain-flattening filter using two LPFGs with divided coil heaters," IEEE Photonics Technology Letters, vol. 17, No. 6, Jun. 2005, 3 pages.
(Continued)

*Primary Examiner* — David W Lambert
(74) *Attorney, Agent, or Firm* — Fish & Richardson P.C.

(57) ABSTRACT

Example fiber amplifiers and gain adjustment methods for the fiber amplifiers are described. One example fiber amplifier includes a first power amplifier, a wavelength level adjuster, and a controller, where the first power amplifier and the wavelength level adjuster are sequentially connected. The controller includes a first input end and a control output end. The first input end is configured to receive an input optical signal of the fiber amplifier, and the control output end is configured to output a first amplification control signal to the first power amplifier, and output an adjustment control signal to the wavelength level adjuster. The wavelength level adjuster is configured to perform power adjustment on each wavelength based on the adjustment control signal.

14 Claims, 6 Drawing Sheets

(51) Int. Cl.
    *H01S 3/10*   (2006.01)
    *H01S 3/23*   (2006.01)
    *H04B 10/25*  (2013.01)
    *H04J 14/02*  (2006.01)

(52) U.S. Cl.
    CPC .......... *H01S 3/2316* (2013.01); *H04B 10/25* (2013.01); *H04J 14/0221* (2013.01)

(56) References Cited

U.S. PATENT DOCUMENTS 7,362,498 B1 * 4/2008 Li .................... H04B 10/2914
                                                       359/341.41
2002/0027704 A1    3/2002 Kobayashi et al.

FOREIGN PATENT DOCUMENTS

| CN | 2523124    Y  | 11/2002 |
| CN | 101015153   A | 8/2007  |
| CN | 101414731   A | 4/2009  |
| CN | 102857301   A | 1/2013  |
| CN | 203673196   U | 6/2014  |
| CN | 104966985   A | 10/2015 |
| JP | 2012146785  A | 8/2012  |
| WO | 2017170008 A1 | 10/2017 |

OTHER PUBLICATIONS

Nakajima et al., "SDM-compatible dynamic gain equalizer using spatial and planar optical circuit," 2017 Optical Fiber Communications Conference and Exhibition (OFC), Mar. 2017, 3 pages.

Office Action issued in Chinese Application No. 201880048014.7 dated Sep. 17, 2020, 11 pages.

PCT International Search Report and Written Opinion issued in International Application No. PCT/CN2018/078639 dated Oct. 8, 2018, 14 pages (with English translation).

Extended European Search Report issued in European Application No. 18909105.1 dated Jan. 26, 2021, 8 pages.

Office Action issued in Chinese Application No. 201880048014.7 dated Apr. 1, 2021, 27 pages (with English translation).

* cited by examiner

FIBER AMPLIFIER AND GAIN ADJUSTMENT METHOD FOR FIBER AMPLIFIER

CROSS-REFERENCE TO RELATED APPLICATIONS

This application is a continuation of International Application No. PCT/CN2018/078639, filed on Mar. 9, 2018, the disclosure of which is hereby incorporated by reference in its entirely.

TECHNICAL FIELD

This application relates to the field of optical communications technologies, and in particular, to a fiber amplifier and a gain adjustment method for the fiber amplifier.

BACKGROUND

Fiber amplifiers are widely used in the fields of optical communications and optical sensing technologies. The fiber amplifiers include a semiconductor optical amplifier, a rare-earth-doped fiber amplifier, and the like. The rare-earth-doped fiber amplifier, for example, an erbium-doped fiber amplifier (EDFA), is an essential device in a wavelength division multiplexing (WDM) system, and is used to amplify an optical signal transmitted in the system. However, a gain curve of this type of fiber amplifier is not flat. In other words, when optical signals with different wavelengths pass through this type of fiber amplifier, gains of the different wavelengths are different. A wavelength with a low gain corresponds to low optical signal power. Consequently, this increases a corresponding bit error rate and even affects transmission performance of the entire system. Therefore, how to adjust the gain curve of the fiber amplifier becomes a major technical problem.

Currently, the fiber amplifier is equipped with a built-in gain flattening filter (GFF), and an insertion loss curve of the GEE interacts with the gain curve of the fiber amplifier, to adjust the gain curve of the fiber amplifier. This solution can only adjust the gain curve of the fiber amplifier as a whole, and adjustment precision is not ideal.

SUMMARY

Embodiments of this application disclose a fiber amplifier and a gain adjustment method for the fiber amplifier, so that power adjustment can be performed on each wavelength of the fiber amplifier, and adjustment precision of a gain curve of the fiber amplifier reaches a wavelength level. This improves adjustment precision of the gain curve of the fiber amplifier.

According to a first aspect, an embodiment of this application discloses a fiber amplifier, including a first power amplifier, a wavelength level adjuster, and a controller, where the first power amplifier and the wavelength level adjuster are sequentially connected, or the wavelength level adjuster and the first power amplifier are sequentially connected; the controller includes a first input end and a control output end, where the first input end is configured to receive an input optical signal of the fiber amplifier, and the control output end is configured to output a first amplification control signal to the first power amplifier, and output an adjustment control signal to the wavelength level adjuster; and the wavelength level adjuster is configured to perform power adjustment on each wavelength based on the adjustment control signal.

In this embodiment of this application, the controller may obtain the first amplification control signal and the adjustment control signal through calculation based on the input optical signal received by the first input end. The adjustment control signal may control the wavelength level adjuster to perform power adjustment on each wavelength. In this way, single-wavelength gain adjustment is implemented on a gain curve of the fiber amplifier, and adjustment precision of the gain curve of the fiber amplifier is improved.

With reference to the first aspect, in a first optional implementation, the controller includes a first storage module and a first calculation module, where the first storage module is configured to store a gain characteristic parameter of the first power amplifier, an adjustment control characteristic parameter of the wavelength level adjuster, and information about target output optical power of the fiber amplifier; and the first calculation module is configured to obtain the first amplification control signal and the adjustment control signal through calculation based on the content stored by the first storage module and optical power of each wavelength of the input optical signal of the fiber amplifier.

With reference to the first optional implementation of the first aspect, in a second optional implementation of the first aspect, the controller may further include a second input end, where the second input end is configured to receive an output optical signal of the fiber amplifier; the first calculation module is further configured to obtain a second amplification control signal and a secondary adjustment control signal through calculation based on the content stored by the first storage module and optical power of each wavelength of the output optical signal when an absolute value of a difference between power of the output optical signal and the target output optical power is greater than a secondary calculation threshold; the control output end is further configured to output the second amplification control signal to the first power amplifier, and output the secondary adjustment control signal to the wavelength level adjuster; and the wavelength level adjuster is further configured to perform power adjustment on each wavelength based on the secondary adjustment control signal.

Compared with the first optional implementation of the first aspect, the second input end is added in this implementation. The first calculation module may obtain the second amplification control signal and the secondary adjustment control signal through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

With reference to the first aspect, in a third optional implementation, the fiber amplifier further includes a second power amplifier, and the first power amplifier, the wavelength level adjuster, and the second power amplifier are sequentially connected; and the control output end is further configured to output a second amplification control signal to the second power amplifier.

In this implementation, the first power amplifier and the second power amplifier may be respectively used as a preamplifier and a power amplifier, and cooperate with the wavelength level adjuster to adjust the gain curve of the fiber amplifier.

With reference to the third optional implementation of the first aspect, in a fourth optional implementation of the first aspect, the controller includes a second storage module and a second calculation module, where the second storage module is configured to store gain characteristic parameters of the first power amplifier and the second power amplifier, an adjustment control characteristic parameter of the wavelength level adjuster, and target output optical power of the fiber amplifier; and the second calculation module is configured to obtain the first amplification control signal, the second amplification control signal, and the adjustment control signal through calculation based on the content stored by the second storage module and optical power of each wavelength of the input optical signal of the fiber amplifier.

In this implementation, the first power amplifier and the second power amplifier amplify optical power of different wavelengths based on the first amplification control signal and the second amplification control signal, and the wavelength level adjuster performs power insertion loss on the different wavelengths based on the adjustment control signal. Therefore, the first power amplifier, the second power amplifier, and the wavelength level adjuster interact with each other to adjust the gain curve of the fiber amplifier.

With reference to the fourth optional implementation of the first aspect, in a fifth optional implementation of the first aspect, the controller may further include a second input end, where the second input end is configured to receive an output optical signal of the fiber amplifier; the second calculation module is further configured to obtain a third amplification control signal, a fourth amplification control signal, and a secondary adjustment control signal through calculation based on the content stored by the second storage module and optical power of each wavelength of the output optical signal when an absolute value of a difference between power of the output optical signal and the target output optical power is greater than a secondary calculation threshold; the control output end is further configured to output the third amplification control signal to the first power amplifier, output the fourth amplification control signal to the second power amplifier, and output the secondary adjustment control signal to the wavelength level adjuster; and the wavelength level adjuster is further configured to perform power adjustment on each wavelength based on the secondary adjustment control signal.

Compared with the fourth optional implementation of the first aspect, the second input end is added in this implementation. The second calculation module may obtain the third amplification control signal, the fourth amplification control signal, and the secondary adjustment control signal through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

With reference to any one of the first aspect and the first to the fifth optional implementations of the first aspect, in a sixth optional implementation of the first aspect, the wavelength level adjuster includes a dispersion module, a wavelength level insertion loss adjustment module, and an aggregation module, where the dispersion module, the wavelength level insertion loss adjustment module, and the aggregation module are sequentially connected; the dispersion module is configured to perform spatial separation on a multi-wavelength optical signal; the aggregation module is configured to perform spatial aggregation on the multi-wavelength optical signal; and the wavelength level insertion loss adjustment module is configured to perform power adjustment on each wavelength based on the adjustment control signal.

In this implementation, the dispersion module performs space separation on the multi-wavelength optical signal, which facilitates power adjustment of each wavelength by the wavelength level adjuster, and the aggregation module may re-aggregate a separated optical signal, which facilitates subsequent transmission.

With reference to the sixth optional implementation of the first aspect, in a seventh optional implementation of the first aspect, the wavelength level insertion loss adjustment module is a liquid crystal on silicon (LCOS) chip, a micro-electro-mechanical systems (MEMS) element, or a liquid crystal LC element.

With reference to the sixth optional implementation of the first aspect, in an eighth optional implementation of the first aspect, the wavelength level adjuster further includes a first beam shaping module and a second beam shaping module, and the first beam shaping module, the dispersion module, the wavelength level insertion loss adjustment module, the aggregation module, and the second beam shaping module are sequentially connected; and the first beam shaping module and the second beam shaping module are configured to perform beam focusing and beam collimation.

According to a second aspect, an embodiment of this application discloses a gain adjustment method for a fiber amplifier, where the method is applied to the fiber amplifier disclosed in any one of the first aspect, or the second optional implementation of the first aspect, or the third optional implementation of the first aspect, or the fourth optional implementation of the first aspect, and the method includes: receiving an input optical signal of the fiber amplifier; obtaining a first amplification control signal and an adjustment control signal through calculation based on the input optical signal of the fiber amplifier, where the adjustment control signal is used to control the wavelength level adjuster to perform power adjustment on each wavelength; and outputting the first amplification control signal to the first power amplifier, and outputting the adjustment control signal to the wavelength level adjuster.

In this embodiment, the adjustment control signal obtained through calculation based on the input optical signal of the fiber amplifier may control the wavelength level adjuster to perform power adjustment on each wavelength. In this way, single-wavelength gain adjustment is implemented on a gain curve of the fiber amplifier, and adjustment precision of the gain curve of the fiber amplifier is improved.

With reference to the second aspect, in a first optional implementation, the obtaining a first amplification control signal and an adjustment control signal through calculation based on optical power of each wavelength of the input optical signal of the fiber amplifier includes: obtaining the first amplification control signal and the adjustment control signal through calculation based on a gain characteristic parameter of the first power amplifier, an adjustment control characteristic parameter of the wavelength level adjuster, target output optical power of the fiber amplifier, and the input optical signal of the fiber amplifier.

With reference to the first optional implementation of the second aspect, in a second optional implementation of the second aspect, after the outputting the first amplification control signal to the first power amplifier, and outputting the adjustment control signal to the wavelength level adjuster, the method further includes: receiving an output optical signal of the fiber amplifier; obtaining a second amplification control signal and a secondary adjustment control signal through calculation based on the gain characteristic parameter of the first power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold; and outputting the second amplification control signal to the first power amplifier, and outputting the secondary adjustment control signal to the wavelength level adjuster.

In this implementation, the second amplification control signal and the secondary adjustment control signal are obtained through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

With reference to the second aspect, in a third optional implementation, the method is applied to the fiber amplifier disclosed in the first optional implementation of the first aspect, and the method further includes: obtaining a second amplification control signal through calculation based on the optical power of each wavelength of the input optical signal of the fiber amplifier; and outputting the second amplification control signal to the second power amplifier.

In this implementation, the first power amplifier and the second power amplifier amplify optical power of different wavelengths respectively based on the first amplification control signal and the second amplification control signal.

With reference to the third optional implementation of the second aspect, in a fourth optional implementation of the second aspect, the obtaining a first amplification control signal and an adjustment control signal through calculation based on optical power of each wavelength of the input optical signal of the fiber amplifier, and the obtaining a second amplification control signal through calculation based on the optical power of each wavelength of the input optical signal of the fiber amplifier include: obtaining the first amplification control signal, the second amplification control signal, and the adjustment control signal through calculation based on gain characteristic parameters of the first power amplifier and the second power amplifier, an adjustment control characteristic parameter of the wavelength level adjuster, target output optical power of the fiber amplifier, and the optical power of each wavelength of the input optical signal of the fiber amplifier.

In this implementation, the first amplification control signal and the second amplification control signal respectively control the first power amplifier and the second power amplifier to amplify optical power of different wavelengths, and the adjustment control signal controls the wavelength level adjuster to perform power insertion loss on the different wavelengths based on the adjustment control signal, Therefore, the first power amplifier, the second power amplifier, and the wavelength level adjuster interact with each other to adjust the gain curve of the fiber amplifier.

With reference to the fourth optional implementation of the second aspect, in a fifth optional implementation of the second aspect, after the outputting the first amplification control signal to the first power amplifier, and outputting the adjustment control signal to the wavelength level adjuster, and the outputting the second amplification control signal to the second power amplifier, the method further includes: receiving an output optical signal of the fiber amplifier; obtaining a third amplification control signal, a fourth amplification control signal, and a secondary adjustment control signal through calculation based on the gain characteristic parameters of the first power amplifier and the second power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold; and outputting the third amplification control signal to the first power amplifier, outputting the fourth amplification control signal to the second power amplifier, and outputting the secondary adjustment control signal to the wavelength level adjuster.

In this implementation, the third amplification control signal, the fourth amplification control signal, and the secondary adjustment control signal are obtained through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

DESCRIPTION OF EMBODIMENTS

This application is mainly specific to a rare-earth-doped fiber amplifier, for example, an EDFA. A person skilled in the art may learn that, with development of technologies, technologies in this application are also applicable to another rare-earth-doped fiber amplifier that is being developed or to be developed. The following describes the technical solutions in the embodiments of this application with reference to the accompanying drawings in the embodiments of this application.

Currently, a fiber amplifier is equipped with a built-in gain flattening filter (GFF), and an insertion loss curve of the GFF is applied to optical power of each wavelength of the fiber amplifier, so that gains corresponding to different wavelengths of the fiber amplifier are attenuated to some extent. In this way, a gain curve of the fiber amplifier can be adjusted. However, the gain curve of the fiber amplifier can only be adjusted as a whole in such an adjustment manner, and adjustment precision of the gain curve is not ideal.

To ensure that adjustment precision of the gain curve of the fiber amplifier reaches a wavelength level, the embodiments of this application disclose a fiber amplifier and a gain adjustment method for the fiber amplifier. Details are separately described below.

Figure 1:
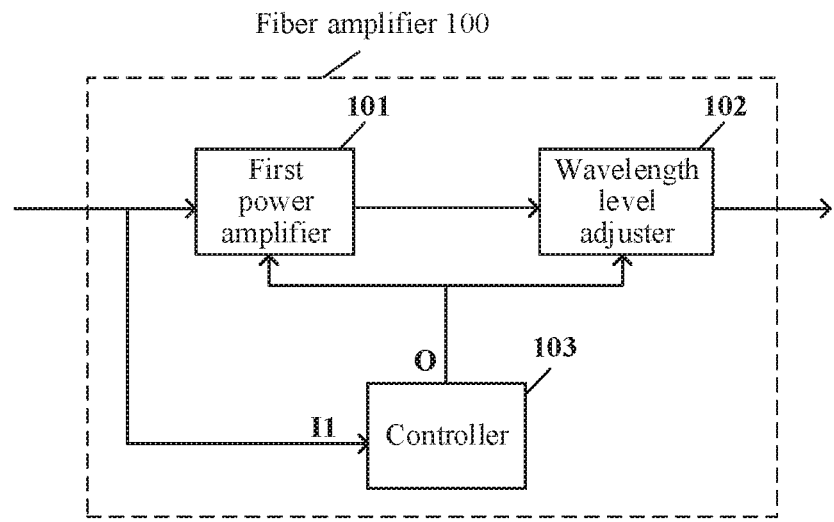
FIG. 1 is a schematic structural diagram of a fiber amplifier according to an embodiment of this application.

FIG. 1 is a schematic structural diagram of a fiber amplifier according to an embodiment of this application. It can be learned from FIG. 1 that the fiber amplifier includes a first power amplifier 101, a wavelength level adjuster 102, and a controller 103. The first power amplifier 101 and the wavelength level adjuster 102 are sequentially connected, where an input end of the first power amplifier is an input end of the fiber amplifier, and an Output end of the wavelength level adjuster is an output end of the fiber amplifier. The controller includes a first input end I1 and a control output end O, where the first input end I1 is configured to receive an input optical signal of the fiber amplifier, and the control output end O is configured to output a first amplification control signal to the first power amplifier 101, and output an adjustment control signal to the wavelength level adjuster 102. The wavelength level adjuster 102 is configured to perform power adjustment on each wavelength based on the adjustment control signal.

In this embodiment, positions of the first power amplifier 101 and the wavelength level adjuster 102 may be interchanged. In other words, the wavelength level adjuster 102 and the first power amplifier 101 are sequentially connected. This is not limited in this application.

In this embodiment, the first power amplifier 101 may include a pump source and a doped fiber. The pump source is disposed upstream or downstream of the doped fiber along a transmission direction of an optical signal, and there may be one or more pump sources.

In this embodiment, that the wavelength level adjuster 102 performs power adjustment on each wavelength based on the adjustment control signal means that the wavelength level adjuster performs power adjustment on each wavelength by generating different insertion loss for each wavelength. In other words, power of an optical signal carrying different wavelengths is amplified a corresponding number of times based on a gain characteristic parameter of the first power amplifier. The wavelength level adjuster generates different insertion loss values for the optical signal with different wavelengths, and the insertion loss values are applied to optical power of each wavelength output by the first power amplifier. In this way, power adjustment is implemented on each wavelength.

In this embodiment, the controller may obtain the first amplification control signal and the adjustment control signal through calculation based on the gain characteristic parameter of the first power amplifier, an adjustment control characteristic parameter of the wavelength level adjuster, information about target output optical power of the fiber amplifier, and the input optical signal of the fiber amplifier. The gain characteristic parameter of the first power amplifier may be a power amplification factor of each wavelength by the first power amplifier. The adjustment control characteristic parameter of the wavelength level adjuster may be a relationship parameter between an insertion loss of each wavelength and the adjustment control signal.

It may be understood that the fiber amplifier disclosed in this embodiment may obtain the first amplification control signal and the adjustment control signal through calculation based on the input optical signal received by the first input end. The first amplification control signal may control the first power amplifier to perform power amplification on each wavelength, the adjustment control signal may control the wavelength level adjuster to perform insertion loss adjustment on each wavelength, and an effect of insertion loss adjustment is applied to optical power of each wavelength of the fiber amplifier. In this way, single-wavelength gain adjustment is implemented on a gain curve of the fiber amplifier, and adjustment precision of the gain curve of the fiber amplifier is improved.

Therefore, the gain curve of the fiber amplifier disclosed in this embodiment may be adjusted to be relatively flat, thereby improving system flatness, releasing a flatness margin designed in a system specification, and reducing a power equalizer (such as a dynamic gain equalizer (DGE)) site.

Currently, a fiber amplifier equipped with a built-in GFF is used as a solution to adjust the gain curve of the fiber amplifier. The GFF has a relatively narrow insertion loss adjustment range, and usually needs to perform insertion loss adjustment in cooperation with a variable optical attenuator (VOA) to meet a requirement of the target output optical power. However, the wavelength level adjuster of the fiber amplifier disclosed in this embodiment of this application has a relatively wide insertion loss adjustment range, and can independently perform insertion loss adjustment on the optical power of each wavelength without cooperation with the original VOA.

In addition, the fiber amplifier disclosed in this embodiment can implement single-wavelength gain adjustment, so that insertion loss values of some wavelengths can be correspondingly controlled when a wavelength is dropped or added in a live network. This effectively suppresses power jitter.

In an optional implementation, the controller 103 includes a first storage module 1031 and a first calculation module 1032. The first storage module 1031 is configured to store the gain characteristic parameter of the first power amplifier, the adjustment control characteristic parameter of the wavelength level adjuster, and the information about the target output optical power of the fiber amplifier. The first calculation module 1032 is configured to obtain the first amplification control signal and the adjustment control signal through calculation based on the content stored by the storage module and the input optical signal of the fiber amplifier.

Figure 2:
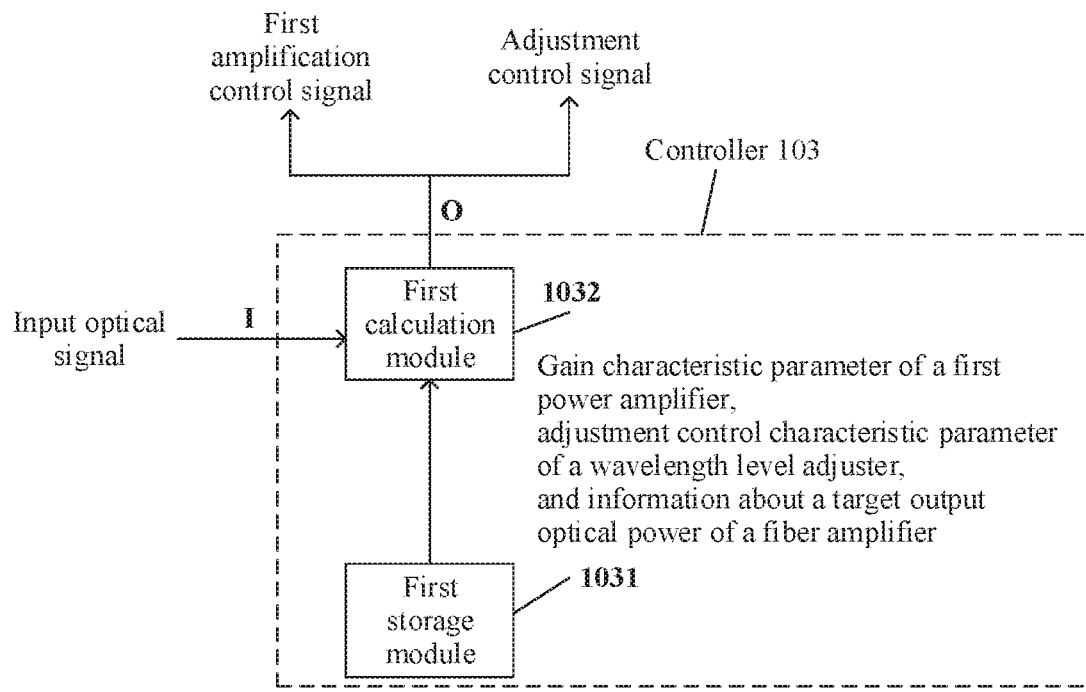
FIG. 2 is a schematic structural diagram of a controller according to an embodiment of this application.

FIG. 2 is a schematic structural diagram of a controller according to an embodiment of this application. The gain characteristic parameter of the first power amplifier may be a power amplification factor of each wavelength by the first power amplifier. The adjustment control characteristic parameter of the wavelength level adjuster may be a relationship parameter between an insertion loss of each wavelength and the adjustment control signal. For example, for a wavelength level adjuster including an LCOS chip, an adjustment control characteristic parameter of the wavelength level adjuster including the LCOS chip may be a relationship parameter between an output deflection angle of a signal of each wavelength and a drive voltage.

In an optional implementation, FIG. 34 is a schematic structural diagram of a wavelength level adjuster according to an embodiment of this application. The wavelength level adjuster 102 includes a dispersion module 1021, a wavelength level insertion loss adjustment module 1022, and an aggregation module 1023. The dispersion module 1021, the wavelength level insertion loss adjustment module 1022, and the aggregation module 1023 are sequentially connected. The dispersion module 1021 is configured to perform spatial separation on a multi-wavelength optical signal. The aggregation module 1023 is configured to perform spatial aggregation on the multi-wavelength optical signal. The wavelength level insertion loss adjustment module 1022 is configured to perform power adjustment on each wavelength based on the adjustment control signal.

The dispersion module 1021 may include an optical element having a dispersion characteristic, such as a grating and a prism, to perform spatial separation on the multi-wavelength optical signal, in other words, to spatially separate an optical signal with different wavelengths. This better facilitates single-wavelength power adjustment performed by the wavelength level insertion loss adjustment module. The aggregation module 1023 may include a dispersion element disposed in a reverse direction, to perform spatial aggregation on the multi-wavelength optical signal, in other words, to spatially aggregate an optical signal with different wavelengths. The wavelength level insertion loss adjustment module 1022 may include an LCOS chip, a MEMS element, an LC element, or the like that may control, by using a control signal, an optical power loss of each wavelength of the LCOS chip, the MEMS element, the LC element, or the like. For example, for the LCOS chip, when different drive voltages are loaded on the LCOS chip, the different wavelengths can be controlled to perform corresponding angle rotation, and an output direction of the optical signal deviates from a direction of a receive port by a specific angle. In this way, different insertion loss adjustment is implemented for different wavelengths.

Figure 3A:
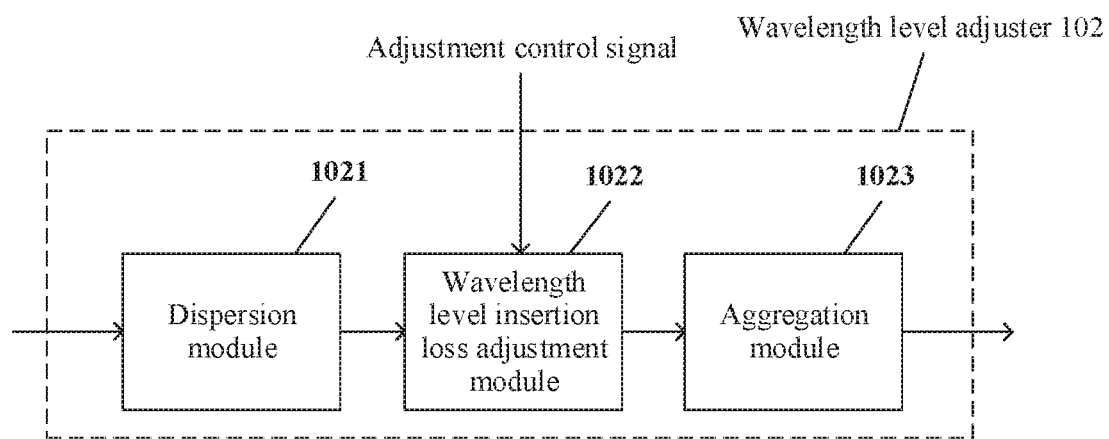
FIG. 3A is a schematic structural diagram of a wavelength level adjuster according to an embodiment of this application.
Figure 3B:
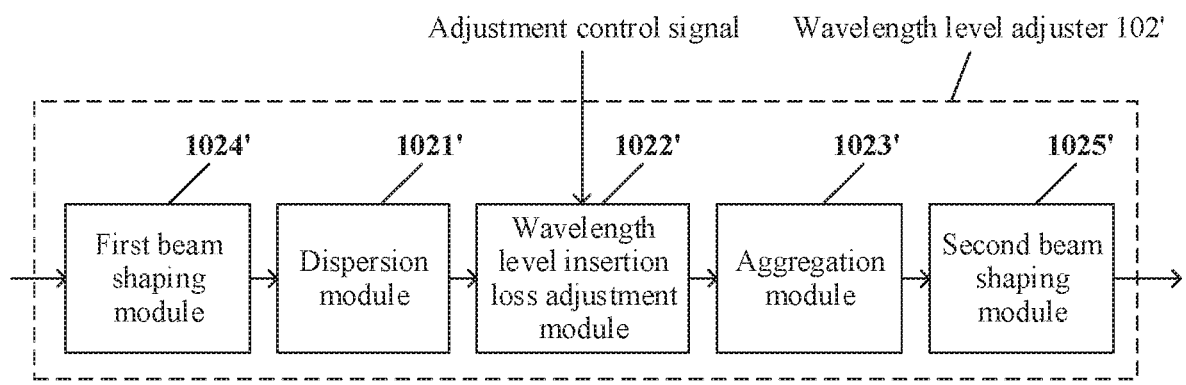
FIG. 3B is a schematic structural diagram of another wavelength level adjuster according to an embodiment of this application.

In an optional implementation, FIG. 39 is a schematic structural diagram of another wavelength level adjuster according to an embodiment of this application. Compared with the wavelength level adjuster 102 shown in FIG. 3A, a wavelength level adjuster 102' in FIG. 3B further includes a first beam shaping module 1024' and a second beam shaping module 1025'. The first beam shaping module 1024', a dispersion module 1021', a wavelength level insertion loss adjustment module 1022', an aggregation module 1023', and the second beam shaping module 1025' are sequentially connected. The first beam shaping module 1024' and the second beam shaping module 1025' are configured to perform beam focusing and beam collimation, and may include elements having a beam focusing function and a beam collimation function, such as a lens and a prism.

Another embodiment of this application discloses another fiber amplifier. Compared with the fiber amplifier shown in FIG. 1, the controller 103 not only includes the first input end I1 and the control output end O, but also includes a second input end I2. The first input end I1 is configured to receive the input optical signal of the fiber amplifier, and the second input end I2 is configured to receive an output optical signal of the fiber amplifier.

The controller 103 obtains the first amplification control signal and the adjustment control signal through calculation based on the input optical signal.

The controller 103 obtains a second amplification control signal and a secondary adjustment control signal through calculation based on the output optical signal when an absolute value of a difference between power of the output optical signal and the target output optical power is greater than a secondary calculation threshold.

The control output end O is configured to output the first amplification control signal or the second amplification control signal to the first power amplifier 101, and output the adjustment control signal or the secondary adjustment control signal to the wavelength level adjuster 102.

The wavelength level adjuster 102 is configured to perform power adjustment on each wavelength based on the adjustment control signal or the secondary adjustment control signal.

In this embodiment, positions of the first power amplifier and the wavelength level adjuster may be interchanged.

In this embodiment, the controller reads the input optical signal, analyzes optical power of each wavelength of the input optical signal, and obtains the first amplification control signal and the adjustment control signal through calculation based on the gain characteristic parameter of the first power amplifier, the adjustment control characteristic parameter of the wavelength level adjuster, and the information about the target output optical power of the fiber amplifier that are stored in the controller. The first power amplifier performs power amplification on each wavelength based on the first amplification control signal, and the wavelength level adjuster performs power adjustment on each wavelength based on the adjustment control signal.

To accurately adjust the gain curve of the fiber amplifier, the first power amplifier and the wavelength level adjuster may perform adjustment for a plurality of times. Specifically, when the absolute value of the difference between the power of the output optical signal and the target output optical power is greater than the secondary calculation threshold, the controller 103 reads the output optical signal of the fiber amplifier, analyzes optical power of each wavelength of the output optical signal, and obtain the second amplification control signal and the secondary adjustment control signal through calculation based on the gain characteristic parameter of the first power amplifier, the adjustment control characteristic parameter of the wavelength level adjuster, and the information about the target output optical power of the fiber amplifier. The first power amplifier 101 performs power amplification on each wavelength again based on the second amplification control signal, and the wavelength level adjuster 102 performs power adjustment on each wavelength again based on the secondary adjustment control signal.

Compared with the fiber amplifier shown in FIG. 1, the second input end I2 is added to the controller of the fiber amplifier disclosed in this embodiment. The controller may obtain the second amplification control signal and the secondary adjustment control signal through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

In an optional implementation, the controller may further include a first storage module and a first calculation module. The first storage module has the same function and stores the same content as the first storage module 1031 shown in FIG. 2. In addition to completing work to be completed by the first calculation module 1032 shown in FIG. 2, the first calculation module is further configured to obtain the second amplification control signal and the secondary adjustment control signal through calculation based on the content stored by the storage module and the output optical signal when the absolute value of the difference between the power of the output optical signal and the target output optical power is greater than the secondary calculation threshold.

The wavelength level adjuster in this embodiment is the same as the wavelength level adjuster 102 or 102' in the previous embodiment. Details are not described herein.

Figure 4A:
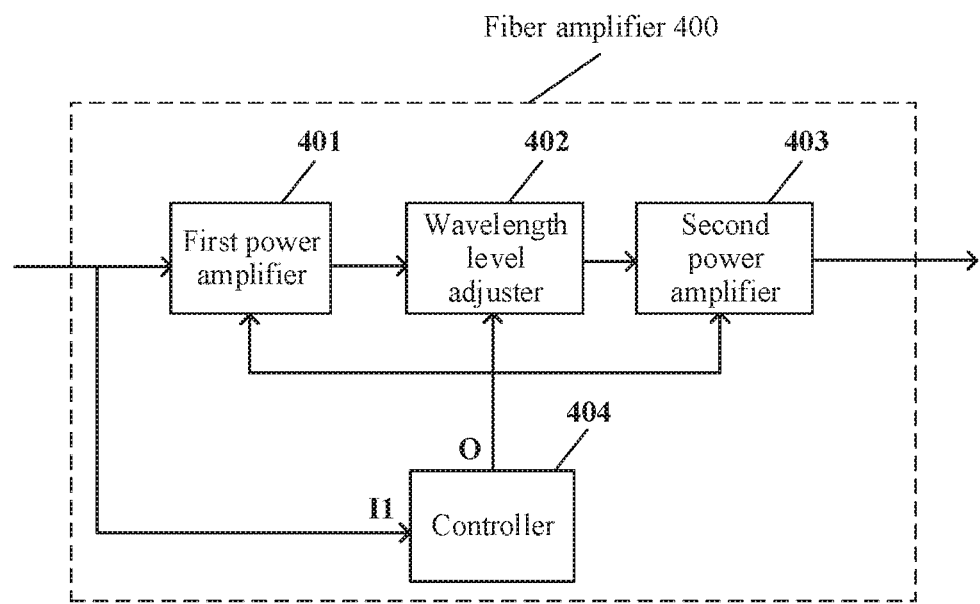
FIG. 4A is a schematic structural diagram of a fiber amplifier according to another embodiment of this application.

FIG. 4A is a schematic structural diagram of a fiber amplifier according to another embodiment of this application. It can be teamed from FIG. 4A that the fiber amplifier 400 includes a first power amplifier 401, a second power amplifier 403, a wavelength level adjuster 402, and a controller 404. The first power amplifier 401, the wavelength level adjuster 402, and the second power amplifier 403 are sequentially connected. The controller 404 includes a first input end I1 and a control output end O. The first input end I1 is configured to receive an input optical signal of the fiber amplifier. The control output end O is configured to output a first amplification control signal to the first power amplifier 401, and output a second amplification control signal to the second power amplifier 403, and output an adjustment control signal to the wavelength level adjuster 402. The wavelength level adjuster 402 is configured to perform power adjustment on each wavelength based on the adjustment control signal.

In this embodiment, the first power amplifier 401 and the second power amplifier 403 are respectively used as a preamplifier and a power amplifier of the fiber amplifier, and may include a pump source and a doped fiber. The pump source is disposed upstream or downstream of the doped fiber along a transmission direction of an optical signal, and there may be one or more pump sources.

Compared with the fiber amplifier shown in FIG. 1, the second power amplifier 403 is added to the fiber amplifier disclosed in this embodiment. The controller 404 may obtain the first amplification control signal, the second amplification control signal, and the adjustment control signal through calculation based on grain characteristic parameters of the first power amplifier 401 and the second power amplifier 403, an adjustment control characteristic parameter of the wavelength level adjuster 402, information about target output optical power of the fiber amplifier, and the input optical signal of the fiber amplifier. The first power amplifier 401 and the second power amplifier 403 perform power amplification on each wavelength respectively based on the first amplification control signal and the second amplification control signal. The wavelength level adjuster 402 performs power adjustment on each wavelength based on the adjustment control signal. Therefore, the first power amplifier 401, the wavelength level adjuster 402, and the second power amplifier 403 cooperate with each other to implement wavelength level adjustment on a gain curve of the fiber amplifier.

In an optional implementation, the controller 404 includes a second storage module 4041 and a second calculation module 4042. In addition to storing the content stored by the first storage module 1031 shown in FIG. 2, the second storage module 4041 further stores the gain characteristic parameter of the second power amplifier. The second calculation module 4042 is configured to obtain the first amplification control signal and the adjustment control signal through calculation based on the content stored by the second storage module 4041 and optical power of each wavelength of the input optical signal of the fiber amplifier.

Figure 4B:
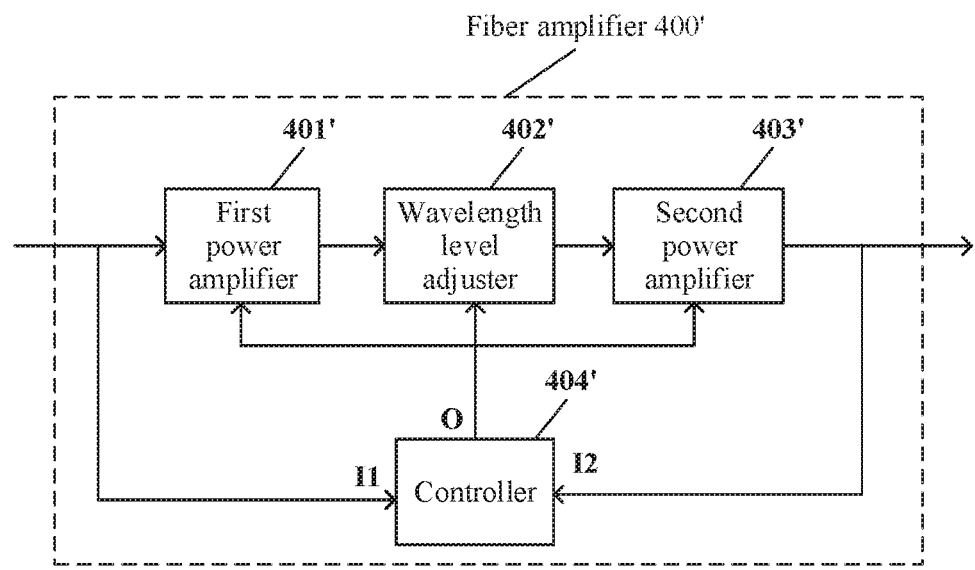
FIG. 4B is a schematic structural diagram of another fiber amplifier according to another embodiment of this application.

In an optional implementation, as shown in FIG. 4B, a controller 404' further includes a second input end I2, where the second input end I2 is configured to receive an output optical signal of a fiber amplifier. A second calculation module 4042' is further configured to obtain a third amplification control signal, a fourth amplification control signal, and a secondary adjustment control signal through calculation based on the content stored by the storage module and optical power of each wavelength of the output optical signal when an absolute value of a difference between power of the output optical signal and the target output optical power is greater than a secondary calculation threshold. The control output end O is further configured to output the third amplification control signal to a first power amplifier 401', output the fourth amplification control signal to a second power amplifier 403', and output the secondary adjustment control signal to a wavelength level adjuster 402'. The wavelength level adjuster 402' is further configured to perform power adjustment on each wavelength based on the secondary adjustment control signal.

Compared with the fiber amplifier shown in FIG. 4A, the second input end I2 is added to the controller of the fiber amplifier disclosed in this implementation. The controller may obtain the third amplification control signal, the fourth amplification control signal, and the secondary adjustment control signal through calculation based on the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

The wavelength level adjuster in this embodiment is the same as the wavelength level adjuster 102 or 102' in the previous embodiment. Details are not described herein.

Figure 5:
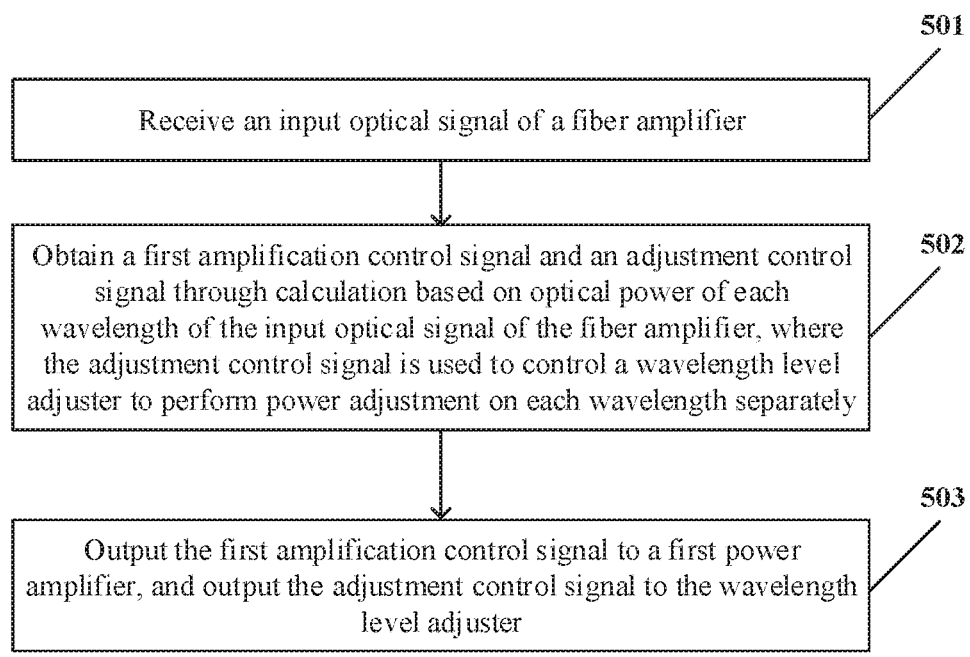
FIG. 5 is a schematic flowchart of a gain adjustment method for a fiber amplifier according to an embodiment of this application.

FIG. 5 shows a gain adjustment method for a fiber amplifier according to an embodiment of this application. The method is applied to the fiber amplifier shown in FIG. 1, and the method includes the following steps:

501. Receive an input optical signal of the fiber amplifier.

502. Obtain a first amplification control signal and an adjustment control signal through calculation based on optical power of each wavelength of the input optical signal of the fiber amplifier, where the adjustment control signal is used to control a wavelength level adjuster to perform power adjustment on each wavelength.

503. Output the first amplification control signal to a first power amplifier, and output the adjustment control signal to the wavelength level adjuster.

In this embodiment, the obtaining a first amplification control signal and an adjustment control signal through calculation based on optical power of each wavelength of the input optical signal of the fiber amplifier may be obtaining the first amplification control signal and the adjustment control signal through calculation based on a gain characteristic parameter of the first power amplifier, an adjustment control characteristic parameter of the wavelength level adjuster, information about target output optical power of the fiber amplifier, and the input optical signal of the fiber amplifier. The gain characteristic parameter of the first power amplifier may be a power amplification factor of each wavelength by the first power amplifier. The adjustment control characteristic parameter of the wavelength level adjuster may be a relationship parameter between an insertion loss of each wavelength and the adjustment control signal.

In this embodiment, the first amplification control signal s used to control the first power amplifier to perform power amplification on an optical signal with different wavelengths. The adjustment control signal is used to control the wavelength level adjuster to implement different insertion losses for optical power of the different wavelengths.

It may be understood that, according to the gain adjustment method disclosed in this embodiment, the first amplification control signal and the adjustment control signal may be obtained through calculation based on the optical power of each wavelength of the input optical signal received by a first input end. The first amplification control signal may control the first power amplifier to perform power amplification on each wavelength, the adjustment control signal may control the wavelength level adjuster to perform insertion loss adjustment on each wavelength, and an effect of insertion loss adjustment is applied to optical power of each wavelength of the fiber amplifier. In this way, single-wavelength gain adjustment is implemented on a gain curve of the fiber amplifier, and adjustment precision of the gain curve of the fiber amplifier is improved.

In an optional implementation, the obtaining a first amplification control signal and an adjustment control signal through calculation based on optical power of each wavelength of the input optical signal of the fiber amplifier includes: obtaining the first amplification control signal and the adjustment control signal through calculation based on a gain characteristic parameter of the first power amplifier, an adjustment control characteristic parameter of the wavelength level adjuster, target output optical power of the fiber amplifier, and the input optical signal of the fiber amplifier.

Specific explanations of the gain characteristic parameter of the first power amplifier and the adjustment control characteristic parameter of the wavelength level adjuster are the same as explanations of the gain characteristic parameter of the first power amplifier and the adjustment control characteristic parameter of the wavelength level adjuster in the fiber amplifier shown in FIG. 1. Details are not described herein.

In an optional implementation, after that outputting the first amplification control signal to a first power amplifier, and outputting the adjustment control signal to the wavelength level adjuster, the method further includes: receiving an output optical signal of the fiber amplifier; obtaining a second amplification control signal and a secondary adjustment control signal through calculation based on the gain characteristic parameter of the first power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold; and outputting the second amplification control signal to the first power amplifier, and outputting the secondary adjustment control signal to the wavelength level adjuster.

Figure 6:
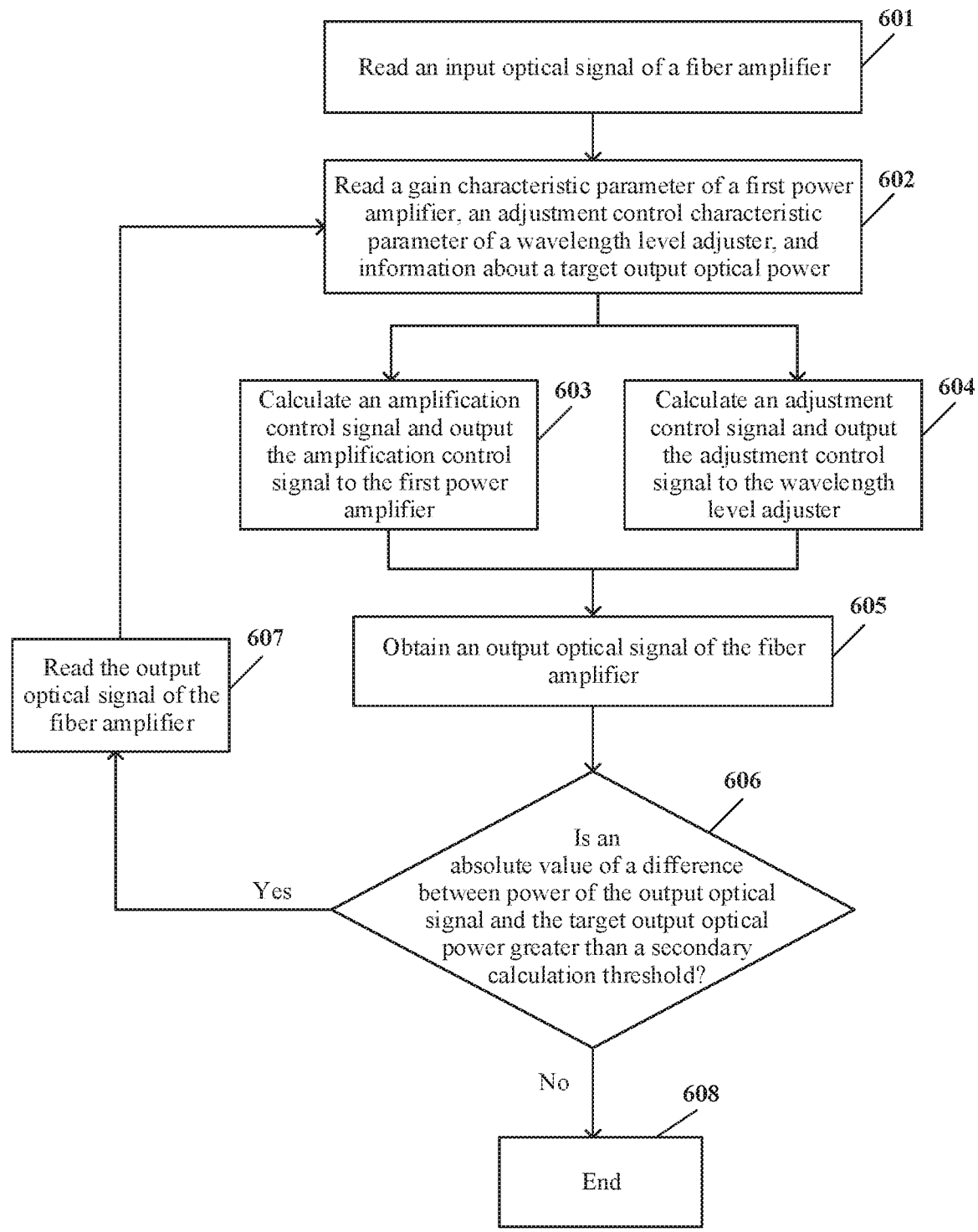
FIG. 6 is a schematic flowchart of a gain adjustment process of a fiber amplifier according to an embodiment of this application.

A specific flowchart of this implementation is shown in FIG. 6.

First, read the input optical signal of the fiber amplifier (step 601), and analyze the optical power of each wavelength of the input optical signal.

Then, read the gain characteristic parameter of the first power amplifier, an adjustment parameter of the wavelength level adjuster, and the information about the target output optical power (step 602).

Calculate the first amplification control signal (step 603) and the adjustment control signal (step 604) based on the read content, output the first amplification control signal to the first power amplifier (step 603), and output the adjustment control signal to the wavelength level adjuster (step 604).

Obtain the output optical signal of the fiber amplifier (step 605), and analyze the optical power of each wavelength of the output optical signal.

To accurately adjust the gain curve of the fiber amplifier, the first power amplifier and the wavelength level adjuster may perform adjustment for a plurality of times. Therefore, the controller reads the output optical signal of the fiber amplifier (step 607) when the absolute value of the difference between the power of the output optical signal and the target output optical power is greater than the secondary calculation threshold (step 606).

In addition, obtain the second amplification control signal (step 603) and the secondary adjustment control signal (step 604) through calculation based on the gain characteristic parameter of the first power amplifier, the adjustment control characteristic parameter of the wavelength level adjuster, and the information about the target output optical power of the fiber amplifier.

The second amplification control signal controls the first power amplifier to perform power amplification on each wavelength again. The secondary adjustment control signal controls the wavelength level adjuster to perform power adjustment on each wavelength again.

It may be understood that the second amplification control signal and the secondary adjustment control signal are obtained through calculation based on the optical power of each wavelength of the output optical signal when the absolute value of the difference between the power of the output optical signal and the target output optical power is greater than the secondary calculation threshold. The secondary adjustment control signal may control the wavelength level adjuster to perform power adjustment on each wavelength again, until an absolute value of a difference between power of the output optical signal and the target output optical power is less than the secondary calculation threshold, so that the power of the output optical signal is closer to the target output optical power. This improves adjustment accuracy of the gain curve of the fiber amplifier.

Figure 7:
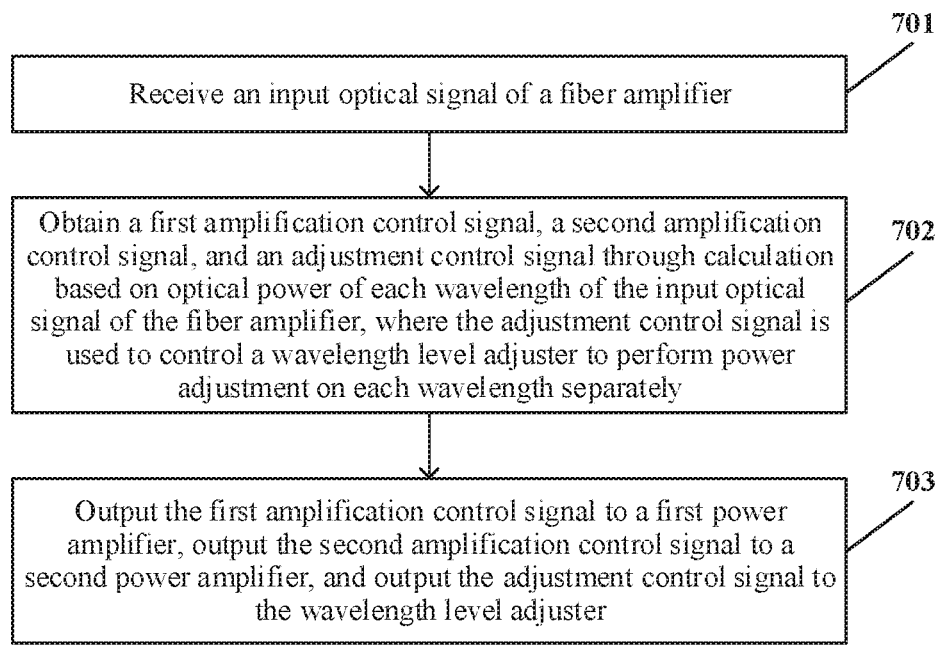
FIG. 7 is a schematic flowchart of a gain adjustment method for another fiber amplifier according to an embodiment of this application.

FIG. 7 shows a gain adjustment method for another fiber amplifier according to an embodiment of this application. The method is applied to the fiber amplifier shown in FIG. 4A, and the method includes the following steps:

701. Receive an input optical signal of the fiber amplifier.

702. Obtain a first amplification control signal, a second amplification control signal, and an adjustment control signal through calculation based on optical power of each wavelength of the input optical signal of the fiber amplifier, Where the adjustment control signal is used to control a wavelength level adjuster to perform power adjustment on each wavelength.

703. Output the first amplification control signal to a first power amplifier, output the second amplification control signal to a second power amplifier, and output the adjustment control signal to the wavelength level adjuster.

A specific implementation method for this implementation is the same as the adjustment implementation method for the fiber amplifier shown in FIG. 4A. The first amplification control signal, the second amplification control signal, and the adjustment control signal are obtained through calculation based on gain characteristic parameters of the first power amplifier and the second power amplifier, an adjustment control characteristic parameter of the wavelength level adjuster, information about target output optical power of the fiber amplifier, and the input optical signal of the fiber amplifier.

The first amplification control signal, the second amplification control signal, and the adjustment control signal cooperate with each other. The first amplification control signal and the second amplification control signal respectively control the first power amplifier and the second power amplifier to perform power amplification on each wavelength. The adjustment control signal controls the wavelength level adjuster to perform power adjustment on each wavelength. In an optional implementation, the obtaining a first amplification control signal and an adjustment control signal through calculation based on optical power of each wavelength of the input optical signal of the fiber amplifier, and the obtaining a second amplification control signal through calculation based on the optical power of each wavelength of the input optical signal of the fiber amplifier include: obtaining the first amplification control signal, the second amplification control signal, and the adjustment control signal through calculation based on gain characteristic parameters of the first power amplifier and the second power amplifier, an adjustment control characteristic parameter of the wavelength level adjuster, target output optical power of the fiber amplifier, and the optical power of each wavelength of the input optical signal of the fiber amplifier.

Specific explanations of the gain characteristic parameters of the first power amplifier and the second power amplifier and the adjustment control characteristic parameter of the wavelength level adjuster are the same as explanations of the gain characteristic parameters of the first power amplifier and the second power amplifier and the adjustment control characteristic parameter of the wavelength level adjuster in the fiber amplifier shown in FIG. 4A. Details are not described herein.

In an optional implementation, after the outputting the first amplification control signal to a first power amplifier, outputting the adjustment control signal to the wavelength level adjuster, and outputting the second amplification control signal to a second power amplifier, the method further includes: receiving an output optical signal of the fiber amplifier; obtaining a third amplification control signal, a fourth amplification control signal, and a secondary adjustment control signal through calculation based on the gain characteristic parameters of the first power amplifier and the second power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold; and outputting the third amplification control signal to the first power amplifier, outputting the fourth amplification control signal to the second power amplifier, and outputting the secondary adjustment control signal to the wavelength level adjuster.

A specific implementation method for this implementation is the same as that of the fiber amplifier shown in FIG. 4B. Details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit.

The foregoing embodiments may be implemented by using a combination of software, hardware, firmware, and the like. When the controller in the foregoing embodiments is implemented by using software, all or a part of the controller may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the processes of the methods involving the controller in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory (ROM), a random access memory (RAM), a magnetic disk, or an optical disc.

The invention claimed is:

1. A fiber amplifier, comprising a first power amplifier, a wavelength level adjuster, and a controller, wherein the first power amplifier is connected to the wavelength level adjuster;
    wherein the controller comprises a first input end and a control output end, wherein the first input end is configured to receive input optical signal of the fiber amplifier, and wherein the control output end is configured to output a first amplification control signal to the first power amplifier, and output an adjustment control signal to the wavelength level adjuster; and
    wherein the wavelength level adjuster comprises a dispersion module, a wavelength level insertion loss adjustment module, and an aggregation module, and wherein the dispersion module, the wavelength level insertion loss adjustment module, and the aggregation module are sequentially connected;
    wherein the dispersion module is configured to perform spatial separation to obtain multiple single-wavelength signals; wherein the wavelength level insertion loss adjustment module is configured to perform power adjustment on each single-wavelength signal of the multiple single-wavelength signals based on the adjustment control signal; and wherein the aggregation module is configured to perform spatial aggregation on the multiple single-wavelength signals.

2. The fiber amplifier according to claim 1, wherein the controller comprises a storage module and a calculation module;
    wherein the storage module is configured to store information about a gain characteristic parameter of the first power amplifier, information about an adjustment control characteristic parameter of the wavelength level adjuster, and information about target output optical power of the fiber amplifier; and
    wherein the calculation module is configured to obtain the first amplification control signal and the adjustment control signal through calculation based on the information stored by the storage module and optical power of each wavelength of the input optical signal of the fiber amplifier.

3. The fiber amplifier according to claim 2, wherein the controller further comprises a second input end, and wherein the second input end is configured to receive an output optical signal of the fiber amplifier;
    wherein the calculation module is further configured to obtain a second amplification control signal and a secondary adjustment control signal through calculation based on the information stored by the storage module and optical power of each wavelength of the output optical signal when an absolute value of a difference between power of the output optical signal and the target output optical power is greater than a secondary calculation threshold;
    wherein the control output end is further configured to output the second amplification control signal to the first power amplifier, and output the secondary adjustment control signal to the wavelength level adjuster; and
    wherein the wavelength level insertion loss adjustment module is further configured to perform power adjustment on each single-wavelength signal of the multiple single-wavelength signals based on the secondary adjustment control signal.

4. The fiber amplifier according to claim 1, wherein the fiber amplifier further comprises a second power amplifier, and wherein the first power amplifier, the wavelength level adjuster, and the second power amplifier are sequentially connected; and
    wherein the control output end is further configured to output a second amplification control signal to the second power amplifier.

5. The fiber amplifier according to claim 4, wherein:
    the controller comprises a storage module and a calculation module;
    the storage module is configured to store gain characteristic parameters of the first power amplifier and the second power amplifier, an adjustment control characteristic parameter of the wavelength level adjuster, and target output optical power of the fiber amplifier; and
    the calculation module is configured to obtain the first amplification control signal, the second amplification control signal, and the adjustment control signal through calculation based on information stored by the storage module and optical power of each wavelength of the input optical signal of the fiber amplifier.

6. The fiber amplifier according to claim 5, wherein the controller further comprises a second input end, and wherein the second input end is configured to receive an output optical signal of the fiber amplifier;
    wherein the calculation module is further configured to obtain a third amplification control signal, a fourth amplification control signal, and a secondary adjustment control signal through calculation based on the information stored by the storage module and optical power of each wavelength of the output optical signal when an absolute value of a difference between power of the output optical signal and the target output optical power is greater than a secondary calculation threshold;

wherein the control output end is further configured to output the third amplification control signal to the first power amplifier, output the fourth amplification control signal to the second power amplifier, and output the secondary adjustment control signal to the wavelength level adjuster; and wherein the wavelength level insertion loss adjustment module is further configured to perform power adjustment on each single-wavelength signal based on the secondary adjustment control signal.

7. The fiber amplifier according to claim 1, wherein the wavelength level insertion loss adjustment module is a liquid crystal on silicon (LCOS) chip, a micro-electromechanical systems (MEMS) element, or a liquid crystal (LC) element.

8. The fiber amplifier according to claim 1, wherein the wavelength level adjuster further comprises a first beam shaping module and a second beam shaping module, and wherein the first beam shaping module, the dispersion module, the wavelength level insertion loss adjustment module, the aggregation module, and the second beam shaping module are sequentially connected; and wherein the first beam shaping module and the second beam shaping module are configured to perform beam focusing and beam collimation.

9. A gain adjustment method for a fiber amplifier, wherein the method comprises:

receiving an input optical signal of the fiber amplifier;

obtaining a first amplification control signal and an adjustment control signal through calculation based on optical power of each wavelength of the input optical signal of the fiber amplifier, wherein the adjustment control signal is used to control a wavelength level adjuster to perform power adjustment on each single-wavelength signal of a received optical signal of the wavelength level adjuster;

outputting the first amplification control signal to a first power amplifier; and outputting the adjustment control signal to the wavelength level adjuster;

obtaining multiple single-wavelength signals by performing spatial separation;

performing power adjustment on each single-wavelength signal of the multiple single-wavelength signals based on the adjustment control signal;

performing spatial aggregation on the multiple single-wavelength signals.

10. The method according to claim 9, wherein the obtaining a first amplification control signal and an adjustment control signal through calculation based on optical power of each wavelength of the input optical signal of the fiber amplifier comprises:

obtaining the first amplification control signal and the adjustment control signal through calculation based on a gain characteristic parameter of the first power amplifier, an adjustment control characteristic parameter of the wavelength level adjuster, target output optical power of the fiber amplifier, and the optical power of each wavelength of the input optical signal of the fiber amplifier.

11. The method according to claim 10, wherein after the outputting the first amplification control signal to the first power amplifier, and outputting the adjustment control signal to the wavelength level adjuster, the method further comprises:

receiving an output optical signal of the fiber amplifier;

obtaining a second amplification control signal and a secondary adjustment control signal through calculation based on the gain characteristic parameter of the first power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold;

outputting the second amplification control signal to the first power amplifier; and outputting the secondary adjustment control signal to the wavelength level adjuster.

12. The method according to claim 9, wherein the method further comprises:

obtaining a second amplification control signal through calculation based on the optical power of each wavelength of the input optical signal of the fiber amplifier; and outputting the second amplification control signal to a second power amplifier.

13. The method according to claim 12, wherein the obtaining a first amplification control signal and an adjustment control signal through calculation based on optical power of each wavelength of the input optical signal of the fiber amplifier, and the obtaining a second amplification control signal through calculation based on the optical power of each wavelength of the input optical signal of the fiber amplifier comprise:

obtaining the first amplification control signal, the second amplification control signal, and the adjustment control signal through calculation based on gain characteristic parameters of the first power amplifier and the second power amplifier, an adjustment control characteristic parameter of the wavelength level adjuster, target output optical power of the fiber amplifier, and the optical power of each wavelength of the input optical signal of the fiber amplifier.

14. The method according to claim 13, wherein after the outputting the first amplification control signal to the first power amplifier, and outputting the adjustment control signal to the wavelength level adjuster, and the outputting the second amplification control signal to the second power amplifier, the method further comprises:

receiving an output optical signal of the fiber amplifier;

obtaining a third amplification control signal, a fourth amplification control signal, and a secondary adjustment control signal through calculation based on the gain characteristic parameters of the first power amplifier and the second power amplifier, the adjustment control characteristic parameter of the wavelength level adjuster, the target output optical power of the fiber amplifier, and optical power of each wavelength of the output optical signal when an absolute value of a difference between power of the output optical signal and the target output optical power is greater than a secondary calculation threshold; and outputting the third amplification control signal to the first power amplifier;

outputting the fourth amplification control signal to the second power amplifier; and outputting the secondary adjustment control signal to the wavelength level adjuster.

\* \* \* \* \*